United States Patent
Raymond et al.

(10) Patent No.: US 8,729,213 B2
(45) Date of Patent: May 20, 2014

(54) BENZYLATED POLYAMINE CURING AGENTS

(75) Inventors: Williams Rene Edouard Raymond, New Tripoli, PA (US); Gamini Ananda Vedage, Bethlehem, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 262 days.

(21) Appl. No.: 13/242,153

(22) Filed: Sep. 23, 2011

(65) Prior Publication Data

US 2013/0079435 A1    Mar. 28, 2013

(51) Int. Cl.
| | |
|---|---|
| B32B 27/38 | (2006.01) |
| C08G 59/46 | (2006.01) |
| C08G 59/54 | (2006.01) |
| C08G 59/56 | (2006.01) |
| C08G 59/60 | (2006.01) |
| C08L 63/00 | (2006.01) |
| C08L 63/02 | (2006.01) |

(52) U.S. Cl.
USPC ........... 528/122; 252/182.13; 252/182.28; 428/413; 525/420; 525/420.5; 525/423; 525/486; 525/504; 525/523; 525/526; 528/107; 528/123; 528/124

(58) Field of Classification Search
None
See application file for complete search history.

(56) References Cited

U.S. PATENT DOCUMENTS

| | | | |
|---|---|---|---|
| 3,624,671 A | 11/1971 | Pellicer | |
| 3,634,316 A | 1/1972 | Ito et al. | |
| 4,308,085 A | 12/1981 | Hoerhold et al. | |
| 5,208,959 A | 5/1993 | Rosier et al. | |
| 5,280,091 A | 1/1994 | Dubowik et al. | |
| 7,396,902 B2 | 7/2008 | Kuwahara et al. | |
| 2009/0023846 A1 | 1/2009 | Vedage et al. | |
| 2009/0029175 A1 | 1/2009 | Vedage et al. | |
| 2009/0030125 A1 | 1/2009 | Vedage et al. | |
| 2009/0163676 A1 | 6/2009 | Vedage et al. | |

FOREIGN PATENT DOCUMENTS

| | | | |
|---|---|---|---|
| DE | 19 23 062 A1 | 11/1969 | |
| DE | 1 942 877 | 4/1970 | |
| GB | 1238099 A | 7/1971 | |
| GB | 2 045 269 A | 10/1980 | |
| GB | 2 364 305 A | 1/2002 | |
| IN | 166475 | 5/1990 | |
| JP | 46-16311 A | * 5/1971 | |
| JP | 46-41458 A | * 12/1971 | |
| JP | 49-17418 | 4/1974 | |
| JP | 47-23530 A | * 11/1977 | |
| JP | 52-45773 A | * 11/1977 | |
| JP | 55-100561 A | * 7/1980 | |

OTHER PUBLICATIONS

Ali, A., et al.; "A New Strategy for the Destabilization of Double-Stranded Nucleic Acids by Phenylalkylamine Derivatives"; Angew. Chem. Int. Ed.; 1998; vol. 37 No. 21; pp. 3016-3019.
Chen, Y., et al.; "Synthesis, Structure, and Functionalization of Homo Heterocalix[2]arene[2]triazines: Versatile Conformation and Cavity Structures Regulated by the Bridging Elements"; J. Org. Chem.; 2010; vol. 75; pp. 3786-3796.
Viovenzana, G., et al.; "A Mimicry of Primary Amines by Bis-Secondary Diamines as Components in the Ugi Four-Component Reaction"; Angew. Chem. Int. Ed.; 2006; vol. 45; pp. 1099-1102.
Hatta, T., et al.; "Synthesis of Water-Soluble Diaza-1,2,5-Thiadiazolo-Cyclophanes"; Heterocycles; vol. 46; 1997; pp. 651-658.
Ruggli, P., et al.; "Derivatives of m-Xylylenediamine"; Helvetica Chimica Acta. XXX(VI); 1947; pp. 1846-1852.
Santacruz-Juarez, E., et al.; "24- and 26-Membered Macrocyclic Diorganotin(IV) Bis-Dithiocarbamate Complexes with N,N'-Disubstituted 1,3- and 1,4-Bis(aminomethyl)benzene and 1,1'-Bis(aminomethyl)ferrocene as Spacer Groups"; Inorganic Chemistry; 2008; vol. 47; pp. 9804-9812.
Tanaka, Y.; "Synthesis and Characteristics of Epoxides"; in C.A. May Ed.; Epoxy Resins Chemistry and Technology;1988; pp. 212-233.

* cited by examiner

*Primary Examiner* — Robert Sellers
(74) *Attorney, Agent, or Firm* — Michael K. Boyer

(57) ABSTRACT

A curing agent composition including at least one benzylated polyamine compound. The benzylated polyamine compound is a reaction product of a benzaldehyde compound or benzyl halide compound and a polyamine according to the following formula:

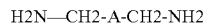

H2N—CH2-A-CH2-NH2 where A is a phenylene group or a cyclohexylene group. A method for making the curing agent composition and an amine-epoxy composition are also disclosed.

27 Claims, No Drawings

BENZYLATED POLYAMINE CURING AGENTS

BACKGROUND OF THE INVENTION

The present invention is directed to methods of benzylation and benzylated compositions from polyamines for curing epoxy resin.

Various methods have been used to reduce the carbamation in epoxy processing by reducing the amount of primary amines. One method includes adducting amines with mono glycidyl ethers. However, this method has the disadvantage of increasing the viscosity of the product. An additional method includes making a Michael addition of acrylonitrile on the primary amine. In that case the viscosity remains low but a retro reaction occurring, in time, releases free acrylonitrile, which makes the product highly toxic and difficult to handle.

Other methods have been tested with limited success, such as making a Mannich base by reaction of the polyamine with formaldehyde and phenol. In such cases a substantial amount of phenol is left that makes the product toxic. This toxicity can be reduced by reacting tris-dimethylaminomethylphenol (K-54) with an amine in a transaminification reaction where by the amine displaces the dimethyl amine (DMA) which is distilled and collected for recycling. This reaction suffers from the drawback of undesirably high viscosity.

U.S. Pat. No. 7,396,902 B2, which is hereby incorporated by reference in its entirety, discloses a curing agent for epoxy resin that is produced from styrenation of meta xylylene diamine or 1,3-BAC (1,3-bis(aminomethyl)cyclohexane. The U.S. Pat. No. 7,396,902 Patent suffers from the drawback that the styrenation process is complicated and arduous.

Benzylated aminopropylated ethylenediamines and benzylated polyalkylene polyamines, as well as the uses thereof are generally disclosed in U.S. Patent Application Publications 2009/0030125 and 2009/0029175, which are hereby incorporated by reference in their entirety. The reactions and products formed in the 2009/0030125 and 2009/0029175 result in a wide range of products and properties, where it is desirable in the art to have greater tailorability and specific product specifications in the resultant benzylated products.

U.S. Pat. No. 3,634,316, which is hereby incorporated by reference in its entirety, discloses a method for forming antiozonant xylylenediamine derivative. The method includes dehydrohalogenation of halogenated alkyls with xylylenediamine. An exemplary relevant claim, is claim 2, where an antiozonant is claimed that is N,N'-dibenzyl-m, and p-xylylenediamine. The product from the U.S. Pat. No. 3,634,316 Patent, for example, in claim 2, is a dibenzylated product, the manufacture of which is not specified. The U.S. Pat. No. 3,634,316 Patent does not disclose the formed compounds use in crosslinking agents to crosslink and harden epoxy resins. In addition, the U.S. Pat. No. 3,634,316 Patent does not disclose or provide a method in which the properties are adjustable or tailorable.

When epoxy resins are cured with most non-aromatic amines, the miscibility of these amines with the epoxy resins is not always good and some incomplete cure can take place. To improve the cure, some diluents such as benzyl alcohol can be used. This introduces a solvent in the system and the resulting system is considered as emissive, meaning that once it will be cured raw materials will be emitted from the coating over time. Due to the introduction of more stringent laws, non-emissive coatings have become more valued.

It is also known that the presence of plentiful primary amines will increase the amount of carbamation experienced by the coating at lower temperatures and higher relative humidity. In order to overcome these problems, the amines have been adducted with monoglycidyl ethers particularly the phenyl glycidyl ether or the o-cresyl glycidyl ether. These reactions are very advantageous to lower the vapor pressure and improve the miscibility of the amine to the resin; unfortunately this adduction tends to increase the viscosity to a very high level which can hinder the application of the product. This type of adduction might also require the removal of the free amine. Should the adduction be carried out far enough to remove all free amine, the viscosity would become much too high and in some cases the product would even be solid. This type of adduction is also limited as each molecule used per molecule amine will remove a reactive site, which can diminish the cross-linking density of the systems particularly with amines having only four or less reactive sites.

There are numerous amine-based curing agents and amine-epoxy compositions that are employed in the amine-epoxy coating industry; however, known products fail to completely address the needs or solve the problems noted above. Accordingly, it is to this end that the present invention is directed. Specifically, methods for making epoxy curing agents and cured epoxy products having reduced carbamation, reduced toxicity and not suffering from the above drawbacks would be desirable in the art.

BRIEF SUMMARY OF THE INVENTION

The present disclosure includes a curing agent composition. The curing agent composition includes at least one benzylated polyamine compound. The benzylated polyamine compound is a reaction product of a benzaldehyde compound or benzyl halide compound and a polyamine according to the following formula:

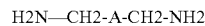

H2N—CH2-A-CH2-NH2 where A is a phenylene group or a cyclohexylene group.

In another exemplary embodiment, the present disclosure includes a method for forming a curing agent composition. The method includes contacting a benzaldehyde compound or benzyl halide compound and a polyamine compound according to the following formula:

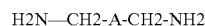

H2N—CH2-A-CH2-NH2 wherein A is a phenylene group or a cyclohexylene group. The benzaldehyde compound or benzyl halide compound is reacted with the polyamine compound under conditions sufficient to form a benzylated polyamine compound.

In another exemplary embodiment, the present disclosure includes an amine-epoxy composition. The amine-epoxy composition includes the contact product of a curing agent composition including at least one benzylated polyamine compound, the benzylated polyamine compound being a reaction product of a benzaldehyde compound or benzyl halide compound and a polyamine according to the following formula:

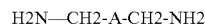

H2N—CH2-A-CH2-NH2 where A is a phenylene group or a cyclohexylene group; and an epoxy composition comprising at least one multifunctional epoxy resin.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Provided is a method for making epoxy curing agents and cured epoxy products having reduced carbamation and reduced toxicity. Epoxy curing agents, according to the present disclosure, have a low viscosity, a good miscibility with the resin and develops desirable properties when utilized as a crosslinker for epoxy resin. Curing agent compositions, according to the present disclosure, can maintain single phase uniformity for extended periods of time, which can be required for storage of the product and its subsequent use in its intended application. Additionally, if these compositions are substantially free of solvents, they can have substantially no VOCs, which can be beneficial for environmental, health and safety issues, as will be appreciated by those skilled in the art. Embodiments of the present disclosure diminish the amount of carbamation in a cured system, particularly when the cured system is in the presence of high humidity. In addition, the epoxy curing agents, according to the present disclosure, provide at or about 100% cure, at room temperature, reducing or eliminating the need for the use of benzyl alcohol or other similar compounds to overcome the B stage cure. The epoxy curing agents, according to the present disclosure, provide a desirably slow cure. The method, according to the present disclosure, is a simpler process which delivers curing agents for epoxy resin, having good compatibility with the resin. In addition, embodiments of the present disclosure result in components that are mixable with other amines for easy formulation. Embodiments of the present disclosure include epoxy curing agents that result in a percentage of epoxy conversion and crosslinking, including conversion rates of 95-98% or more.

The following definitions and abbreviations are provided in order to aid those skilled in the art in understanding the detailed description of the present invention.
AHEW—amine hydrogen equivalent weight
DGEBA—diglycidyl ether of bisphenol-A, EEW 182-192
DER™ 331—Liquid DGEBA
EDA—ethylenediamine
EEW—epoxy equivalent weight
EPIKOTE® 828 (EPON® 828)—liquid epoxy resin with EEW approximately 184-192 EPIKOTE® and EPON® are registered trademarks of Momentive Specialty Chemicals Inc., New Jersey.
mXDA—metaxylylene diamine manufactured by Mitsubishi Gas Chemical Co.
IPDA—isophoronediamine, AHEW=43
PHR—parts per hundred weight resin The term "contact product", as utilized herein, describes compositions wherein the components are contacted together in any order, in any manner, and for any length of time. For example, the components can be contacted by blending or mixing. Further, contacting of any component can occur in the presence or absence of any other component of the compositions or formulations described herein. Still further, two or more of the components of the contact product may react to form other components composing the composition. Combining additional materials or components can be done by any method known to one of skill in the art.

Embodiments of the present disclosure include curing agent compositions and methods of making such compositions. These curing agent compositions can be used to cure, harden, and/or crosslink an epoxy resin. One embodiment includes curing agent compositions comprising at least one benzylated polyamine compound, the benzylated polyamine compound being a reaction product of a benzaldehyde compound or a benzyl halide compound and a polyamine according to the following formula:

$$\text{H2N—CH2-A-CH2-NH2} \qquad (I)$$

where A is a phenylene group or a cyclohexylene group. In one embodiment, the benzylated compounds include the reaction product of the reductive amination of a benzaldehyde compound with a diamine of formula (I). In another embodiment, the benzylated polyamine compounds include the reaction product of a benzyl halide with a polyamine of formula (I). In yet another embodiment, the at least one of the polyamines from formula (I) have been benzylated. Generally, curing agent compositions, according to embodiments of the present disclosure, have an amine hydrogen equivalent weight (AHEW) based on 100% solids from about 40 to about 200 or about 75 to about 150. The degree of benzylation depends on the equivalents ratio of benzaldehyde compound to reactive amine hydrogens in the polyamine of formula (I), for example, in the reductive amination reaction. Thus, an exemplary embodiment of the present disclosure, the curing agent composition comprises a benzylated polyamine of formula (I) component comprising polyamine molecules having one, or two, or three, or four benzyl groups, or any combination thereof. In another aspect, such benzylated polyamine of formula (I) component for the present invention comprises at least 20 wt % benzylated polyamine of formula (I) having at least two benzyl groups, i.e., having two or more benzyl groups. In other aspects of the invention, the benzylated polyamine of formula (I) component comprises 20 to 90 wt %, especially 30 to 80 wt %, benzylated polyamine of formula (I) having at least two benzyl groups. Generally, this curing agent composition has an amine hydrogen equivalent weight (ANEW) based on 100% solids from about 50 to about 160. In a different aspect, the curing agent composition has an AHEW based on 100% solids from about 80 to about 120. Further, the curing agent composition can have an AHEW based on 100% solids from about 30 to about 100. In these aspects, the preferred embodiment comprises a benzylated polyamine of formula (I).

In certain embodiments according to the present disclosure, the present invention provides a curing agent composition comprising the contact product of (i) at least one benzylated polyamine compound and (ii) at least one multifunctional amine having three or more active amine hydrogens.

In another aspect of this invention, the at least one benzylated polyamine compound has the formula:

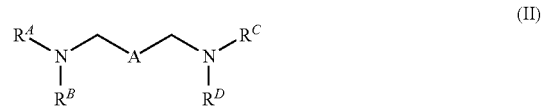

where RA is a substituted or unsubstituted benzyl group; RB, RC, and RD are independently RA or a hydrogen atom; A is a phenylene group or a cyclohexylene group, provided that the benzylated polyamine of formula (I) has more than two active amine hydrogen atoms. In a particularly suitable embodiment, RA and RC are benzyl or vanillyl, or preferably benzyl. In a particularly suitable embodiment, A is phenylene.

In yet another aspect of the present invention, the benzylated polyamine of formula (I) compound is of the above formula (II), wherein $R^A$ is benzyl or vanillyl; $R^B$, $R^C$, and $R^D$ are hydrogen atoms. In a further aspect, $R^A$ and $R^C$ are benzyl or vanillyl, especially benzyl, and $R^B$ and $R^D$ are hydrogen atoms. In a desired embodiment of these aspects, A is phenylene.

Given the many possible locations on the polyamine of formula (I) compound where the benzyl groups can replace a hydrogen atom, the product resulting from the reductive reaction of at least one polyamine of formula (I) compound and a benzaldehyde compound or from the reaction with a benzyl halide is necessarily a mixture of many different species, where some of the $R^B$, $R^C$ and $R^D$ groups are hydrogen and others are benzyl groups. Which and how many of the "R" groups are converted from hydrogen to benzyl groups depends on many factors, among those being the reaction conditions, catalyst selection, reactants ratio, choice of reactant (specific halide compound or benzaldehyde compound), and the like. For example, using a benzaldehyde compound as the reactant in a molar reactant ratio of benzaldehyde to the polyamine of formula (I) compound of between about 1:1 to about 1.9:1, the major component of the reaction product is where $R^A$ is benzyl, $R^C$ is benzyl or a hydrogen atom, and $R^B$ and $R^D$ are hydrogen atoms.

Additionally, curing agent compositions described herein can be solvent-based. Alternatively, in another aspect of the present invention, these compositions can further comprise at least one diluent, such as, for example, an organic solvent, or an organic or inorganic acid. Appropriate organic solvents are well known to those skilled in the art of amine formulation chemistry. Exemplary organic solvents suitable for use in the present invention include, but are not limited to, benzyl alcohol, butanol, toluene, xylene, methyl ethyl ketone, and the like, or combinations thereof. Non-limiting examples of organic and inorganic acids are acetic acid, sulfamic acid, lactic acid, salicylic acid, sebacic acid, boric acid, phosphoric acid, and the like, or combinations thereof. Such acids can increase the curing speed of the curing agent composition.

The curing agent compositions also can be further modified with monofunctional epoxides, such as, for example, phenyl glycidyl ether, o-cresyl glycidyl ether, p-tert-butylphenyl glycidyl ether, n-butyl glycidyl ether, and other similar glycidyl ethers or esters. Further, curing agent compositions disclosed herein can be blended with other commercially available curing agents. Such commercially available curing agents include, but are not limited to, solvent based, solvent free or water-based curing agents, which can be employed in a blend to target specific properties, such as cure rate, drying speed, hardness development, clarity, and gloss.

The method for forming the benzylated polyamine compound includes addition of an aliphatic polyamine represented by formula (I) and benzaldehyde followed by a reduction with $H_2$ in presence of a catalyst, such as a Pd/C catalyst. The benzylated polyamine of formula (I) of the present invention can be prepared by the reductive amination of at least one polyamine of formula (I) compound with the benzaldehyde compound. Procedures for the reductive amination of benzaldehyde are generally known to those of skill in the art. Generally, these procedures involve condensing the benzaldehyde with the amine, then reducing the intermediate Schiff base. The reduction is typically conducted in the presence of a metal catalyst in a hydrogen-rich atmosphere at pressures above atmospheric pressure. In one exemplary embodiment, benzylated mXDA is prepared by reacting mXDA with benzaldehyde, followed by reduction of the system in presence of a suitable catalyst. The benzylation of mXDA was carried out at a value of less than two mole benzyldehyde per mole mXDA, preferably 1.2 to 1.3 mole benzaldehyde per mole of amine, therefore having a product with a small amount of free amine.

In accordance with the curing agent compositions and methods of making such compositions disclosed herein, the molar reactant ratio of the benzaldehyde compound to the at least one polyamine of formula (I) compound is in a range from about 0.8:1 to about 1.98:1. In another aspect, the molar reactant ratio of the benzaldehyde compound to the at least one polyamine of formula (I) compound is about 0.9:1, about 1:1, about 1.1:1, about 1.2:1, about 1.3:1, about 1.4:1, about 1.5:1, about 1.6:1, about 1.7:1, about 1.8:1, or about 1.9:1. In yet another aspect, the molar reactant ratio is in a range from about 0.9:1 to about 1.8:1, or from about 1:1 to about 1.6:1. In a further aspect, the molar reactant ratio of the benzaldehyde compound to the at least one polyamine of formula (I) compound is in a range from about 1.2:1 to about 1.5:1. In yet another aspect, the product should retain more than two reactive amine hydrogen, to allow a proper cross-linking of the epoxy resin. Even at molar reactant ratios of the benzaldehyde compound to the at least one polyamine of formula (I) compound, less than 1:1 dibenzylated aminopropylatedalkylenediamine APADAs are produced in minor amounts. However, to afford sufficient amounts of dibenzylated polyamine of formula (I), molar reactant ratios of the benzaldehyde compound to the at least one polyamine of formula (I) compound of 1:1 to 1.6:1 is preferably used.

The benzylated polyamine of formula (I) of the present disclosure can also be prepared by the reaction of at least one polyamine of formula (I) compound with a benzyl halide. Generally, molar reactant ratios of the at least one benzyl halide compound to the at least one APADA compound are within a range from about 0.8:1 to about 2:1. In another aspect, the molar reactant ratio is about 0.9:1, about 1:1, about 1.1:1, about 1.2:1, about 1.3:1, about 1.4:1, about 1.5:1, about 1.6:1, about 1.7:1, about 1.8:1, or about 1.9:1. Yet, in another aspect, the molar reactant ratio of the at least one benzyl halide to the at least one polyamine of formula (I) compound is in a range from about 1.2:1 to about 1.5:1.

In another embodiment of this aspect of the present disclosure, the curing agent composition comprises a benzylated polyamine of formula (I) component comprising polyamine molecules having one, or two, or three, or four benzyl groups, or any combination thereof. In one aspect, such benzylated polyamines of formula (I) component for the present invention comprise at least 20 wt % benzylated polyamines of formula (I) having at least two benzyl groups, i.e., having two or more benzyl groups. In other aspects, the benzylated polyamines of formula (I) component comprise 20 to 90 wt %, especially 30 to 80 wt %, benzylated polyamines of formula (I) having at least two benzyl groups. The curing agent composition, in this aspect of the present invention, can have an AHEW based on 100% solids from about 50 to about 160. Further, such curing agent composition can have an ANEW based on 100% solids in the range from about 80 to about 120. In a different aspect, the curing agent composition has an AHEW based on 100% solids from about 30 to about 100. In these aspects, the preferred embodiment comprises benzylated polyamines of formula (I).

In each of the above aspects of the invention, the curing agent composition comprises a benzylated polyamines of formula (I) component comprising polyamine molecules having one, or two, or three, or four alkyl groups or any combination thereof. Such benzylated polyamines of formula (I) component for the present invention comprise at least 20 wt % benzylated polyamines of formula (I) having one or more benzyl groups, preferably 20 to 90 wt %, especially 30 to 80 wt % polyamines of formula (I) having one or more benzyl groups.

Other embodiments of the present disclosure include amine-epoxy compositions. For example, an amine-epoxy composition, in accordance with the present disclosure, includes the reaction product of A) at least one benzylated polyamine compound; and B) an epoxy composition comprising at least one multifunctional epoxy resin. In another embodiment, an amine-epoxy composition includes the reaction product of A) a curing agent composition comprising the contact product of (i) at least one benzylated; and (ii) at least one multifunctional amine having three or more active amine hydrogens; and B) an epoxy composition comprising at least one multifunctional epoxy resin. Optionally, various additives can be present in the compositions or formulations used to produce fabricated articles, dependent upon the desired properties. These additives can include, but are not limited to, solvents (including water), accelerators, plasticizers, fillers, fibers such as glass or carbon fibers, pigments, pigment dispersing agents, rheology modifiers, thixotropes, flow or leveling aids, surfactants, defoamers, biocides, or any combination thereof.

The polyamine compounds that are useful in producing the benzylated polyamine compounds according to the present disclosure include, but are not limited to, diamines represented by formula (I). Other suitable polyamines include orthoxylylenediamine, metaxylylenediamine, paraxylylenediamine, 1.2-bis(aminomethyl)cyclohexane, 1,3-bis(aminomethyl)cyclohexane, 1,4-bis(aminomethyl)cyclohexane. Metaxylylenediamine, 1,3-bis(aminomethyl)cyclohexane are particularly suitable. These amines can be used individually or mixed with one another.

The benzylated polyamine compound is a benzylated polyamine, the polyamine having a structure according to formula (I). In another embodiment, of each of the above aspects the benzylated amines can be a benzylated orthoxylylenediamine, metaxylylenediamine, paraxylylenediamine, 1,2-bis(aminomethyl)cyclohexane, 1,3-bis(aminomethyl)cyclohexane, 1,4-bis(aminomethyl)cyclohexane, from these the metaxylylenediamine and the 1,3-bis(aminomethyl)cyclohexane or mixtures thereof. In one embodiment, the benzylated amine is a mixture of benzylated polyamine compounds, such as a mixture comprising benzylated orthoxylylenediamine, metaxylylenediamine, and paraxylylenediamine; or a mixture comprising benzylated 1,2-bis(aminomethyl)cyclohexane, 1,3-bis(aminomethyl)cyclohexane, and 1,4-bis(aminomethyl)cyclohexane.

Benzaldehyde compounds suitable for use in the benzylation of the polyamines include unsubstituted benzaldehyde and substituted benzaldehydes. Suitable substituted benzaldehydes include, but are not limited to, compounds of the formula PhCHO, where Ph is a moiety including an aromatic ring, in which Ph is substituted with one or more of halogen atoms, $C_1$-$C_4$ alkyl, methoxy, ethoxy, amino, hydroxyl or cyano groups. In one embodiment, the benzaldehyde compound is benzaldehyde and in another embodiment, the benzaldehyde compound is vanillin.

Benzyl halide compounds suitable for use in the benzylation of the polyamines include benzyl fluoride, benzyl chloride, benzyl bromide or benzyl iodide. The benzyl group may comprise unsubstituted benzyl or a substituted benzyl group. Substituted benzyl groups include, but are not limited to, radicals of the formula $PhCH_2$—, where Ph is a moiety including an aromatic ring, in which Ph is unsubstituted or substituted with one or more of halogen atoms, $C_1$-$C_4$ alkyl, methoxy, ethoxy, amino, hydroxyl or cyano groups. In one embodiment, the benzyl group is benzyl and in another embodiment the benzyl is vanillyl.

When the polyamines of formula (I), such as metaxylylenediamine, are benzylated, the resultant product has a lower viscosity which allows benzylation to a point where there is little or no free amine is present in the final product. While not wishing to be bound by theory, it is believed that the removal of the free amine helps in reducing the carbamation of the film caused by the reaction of the primary amine in the presence of water and carbon dioxide. The decrease/absence of smoking or fuming; the improved compatibility with epoxy resin; the lower tendency to carbamate; and the low level of free, unreacted amine in the final product result in improved handling properties.

Curing agent compositions in accordance with the present disclosure can comprise at least one multifunctional amine. Multifunctional amine, as used herein, describes compounds with amine functionality and which contain three (3) or more active amine hydrogens.

Non-limiting examples of multifunctional amines that are within the scope of the present invention include, but are not limited to, an aliphatic amine, a cycloaliphatic amine, an aromatic amine, a poly(alkylene oxide) diamine or triamine, a Mannich base derivative of an aliphatic amine, a cycloaliphatic amine, or an aromatic amine; a polyamide derivative of an aliphatic amine, a cycloaliphatic amine, or an aromatic amine with a dimer fatty acid, or a mixture of a dimer fatty acid and fatty acid; an amidoamine derivative of an aliphatic amine, a cycloaliphatic amine, or an aromatic amine with a fatty acid; and an amine adduct derivative of an aliphatic amine, a cycloaliphatic amine, or an aromatic amine with a diglycidyl ether of bisphenol A or bisphenol F, or an epoxy novolac resin, and the like, or any combination thereof.

If the multifunctional amine is different from the benzylated polyamines of formula (I), AHEW can be calculated based on its chemical structure, or is often provided by the supplier of the amine in case of a mixture. The AHEW for the benzylated polyamines of formula (I) compound, $AHEW_B$, is determined using the following formula, assuming the polyamines of formula (I) is the reductive amination product of x moles of benzaldehyde, for example, with 1 mole of a polyamines of formula (I) compound, FormI (the polyamines of formula (I) compound and the benzaldehyde are discussed in greater detail below):

$$AHEW_B = \frac{MW_{FormI} + x \cdot (MW_{Ald} - 16)}{f - x};$$

wherein:
$MW_{FormI}$ is the average molecular weight of the polyamines of formula (I);
$MW_{Ald}$ is the molecular weight of the benzaldehyde;
f is the average amine hydrogen functionality of the polyamines of formula (I); and
x is the number of moles benzaldehyde used; and
$MW_{BformI}$ is the average molecular weight of the benzylated polyamines of formula (I) and can be calculated as follows:

$$MW_{BformI} = MW_{FormI} + x \cdot (MW_{Ald} - 16)$$

More than one multifunctional amine can be used in the compositions of the present invention. For example, the at least one multifunctional amine can comprise an aliphatic amine and a Mannich base derivative of a cycloaliphatic amine. Also, the at least one multifunctional amine can comprise one aliphatic amine and one different aliphatic amine.

Exemplary aliphatic amines include polyethyleneamines (ethylenediamine, diethylenetriamine, triethylenetetraamine, pentaethylenehexamine, and the like), polypropyleneamines, aminopropylated ethylenediamines (N-3-aminopropyl ethylenediamine (Am3), N,N'-bis(3-aminopropyl)ethylenediamine (Am4), N,N,N'-tris(3-aminopropyl)ethylenediamine (Am5), and the like), aminopropylated propylenediamines, 1,6-hexanediamine, 3,3,5-trimethyl-1,6-hexanediamine, 3,5,5-trimethyl-1,6-hexanediamine, 2-methyl-1,5-pentanediamine, and the like, or combinations thereof. In one aspect of this invention, the at least one multifunctional amine is EDA, DETA, TETA, TEPA, propylenediamine, dipropylenetriamine, tripropylenetetramine, Am3, Am4, Am5, N-3-aminopropyl-1,3-diaminopropane, N,N'-bis(3-aminopropyl)-1,3-diaminopropane, N,N,N'-tris(3-aminopropyl)-1,3-diaminopropane, or any combination thereof. Additionally, the poly(alkylene oxide) diamines and triamines commercially available under the JEFFAMINE® trademark from Huntsman Corporation, are useful in the present invention. Illustrative examples include, but are not limited to, JEFFAMINE® D-230, JEFFAMINE® D-400, JEFFAMINE® D-2000, JEFFAMINE® D-4000, JEFFAMINE® T-403, JEFFAMINE® EDR-148, JEFFAMINE® EDR-192, JEFFAMINE® C-346, JEFFAMINE® ED-600, JEFFAMINE® ED-900, JEFFAMINE® ED-2001, and the like, or combinations thereof. JEFFAMINE® is a registered trademark of Huntsman Petrochemical LLC.

Cycloaliphatic and aromatic amines include, but are not limited to, 1,2-diaminocyclohexane, 1,3-diaminocyclohexane, 1,4-diaminocyclohexane, hydrogenated ortho-toluenediamine, hydrogenated meta-toluenediamine, metaxylylene diamine, hydrogenated metaxylylene diamine (referred to commercially as 1,3-BAC), isophorone diamine, norbornane diamines, 3,3'-dimethyl-4,4'-diaminodicyclohexyl methane, 4,4'-diaminodicyclohexyl methane, 2,4'-diaminodicyclohexyl methane, a mixture of methylene bridged poly(cyclohexyl-aromatic)amines, and the like, or combinations thereof. The mixture of methylene bridged poly(cyclohexyl-aromatic)amines is abbreviated as either MBPCAA or MPCA, and is described in U.S. Pat. No. 5,280,091, which is incorporated herein by reference in its entirety. In one aspect of the present invention, the at least one multifunctional amine is a mixture of methylene bridged poly(cyclohexyl-aromatic)amines (MPCA).

Mannich base derivatives can be made by the reaction of the above described aliphatic amines, cycloaliphatic amines, or aromatic amines with phenol or a substituted phenol and formaldehyde. An exemplary substituted phenol used to make Mannich bases with utility in the present invention is cardanol, which is obtained from cashew nut shell liquid. Alternatively, Mannich bases can be prepared by an exchange reaction of a multifunctional amine with a tertiary amine containing a Mannich base, such as tris-dimethylaminomethylphenol (commercially available as ANCAMINE® K-54 from Air Products and Chemicals, Inc.) or bis-dimethylaminomethylphenol. Polyamide derivatives can be prepared by the reaction of an aliphatic amine, cycloaliphatic amine, or aromatic amine with dimer fatty acid, or mixtures of a dimer fatty acid and a fatty acid. Amidoamine derivatives can be prepared by the reaction of an aliphatic amine, cycloaliphatic amine, or aromatic amine with fatty acids. Amine adducts can be prepared by the reaction of an aliphatic amine, cycloaliphatic amine, or aromatic amine with an epoxy resin, for example, with the diglycidyl ether of bisphenol-A, the diglycidyl ether of bisphenol-F, or epoxy novolac resins. The aliphatic, cycloaliphatic, and aromatic amines also can be adducted with monofunctional epoxy resins, such as phenyl glycidyl ether, cresyl glycidyl ether, butyl glycidyl ether, other alkyl glycidyl ethers, and the like.

Amine-epoxy compositions of the present invention comprise the reaction product of a curing agent composition and an epoxy composition comprising at least one multifunctional epoxy resin. Multifunctional epoxy resin, as used herein, describes compounds containing 2 or more 1,2-epoxy groups per molecule. Epoxide compounds of this type are well known to those of skill in the art and are described in Y. Tanaka, "Synthesis and Characteristics of Epoxides", in C. A. May, ed., *Epoxy Resins Chemistry and Technology* (Marcel Dekker, 1988), which is incorporated herein by reference in its entirety.

The relative amount chosen for the epoxy composition versus that of the curing agent composition, or hardener, can vary depending upon, for example, the end-use article, its desired properties, and the fabrication method and conditions used to produce the end-use article. For instance, in coating applications using certain amine-epoxy compositions, incorporating more epoxy resin relative to the amount of the curing agent composition, can result in coatings which have increased drying time, but with increased hardness and improved appearance as measured by gloss. Amine-epoxy compositions of the present invention generally have stoichiometric ratios of epoxy groups in the epoxy composition to amine hydrogens in the curing agent composition ranging from about 1.5:1 to about 0.7:1. For example, such amine-epoxy compositions can have stoichiometric ratios of about 1.5:1, about 1.4:1, about 1.3:1, about 1.2:1, about 1.1:1, about 1:1, about 0.9:1, about 0.8:1, or about 0.7:1. In another aspect, the stoichiometric ratio ranges from about 1.3:1 to about 0.7:1. In yet another aspect, the stoichiometric ratio ranges from about 1.2:1 to about 0.8:1. In still another aspect, the stoichiometric ratio ranges from about 1.1:1 to about 0.9:1.

One class of epoxy resins suitable for use in the present invention comprises the glycidyl ethers of polyhydric phenols, including the glycidyl ethers of dihydric phenols. Illustrative examples include, but are not limited to, the glycidyl ethers of resorcinol, hydroquinone, bis-(4-hydroxy-3,5-difluorophenyl)-methane, 1,1-bis-(4-hydroxyphenyl)-ethane, 2,2-bis-(4-hydroxy-3-methylphenyl)-propane, 2,2-bis-(4-hydroxy-3,5-dichlorophenyl)propane, 2,2-bis-(4-hydroxyphenyl)-propane (commercially known as bisphenol A), bis-(4-hydroxyphenyl)-methane (commercially known as bisphenol F, and which may contain varying amounts of 2-hydroxyphenyl isomers), and the like, or any combination thereof. Additionally, advanced dihydric phenols of the following structure also are useful in the present invention:

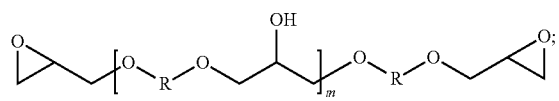

where m is an integer, and R is a divalent hydrocarbon radical of a dihydric phenol, such as those dihydric phenols listed above. Materials according to this formula can be prepared by polymerizing mixtures of a dihydric phenol and epichlorohydrin, or by advancing a mixture of a diglycidyl ether of dihydric phenol. While in any given molecule the value of m is an integer, the materials are invariably mixtures which can be characterized by an average value of m, which is not necessarily a whole number. Polymeric materials with an average value of m between 0 and about 7 can be used in one aspect of the present invention.

In another aspect, epoxy novolac resins, which are the glycidyl ethers of novolac resins, can be used as multifunctional epoxy resins in accordance with the present invention. In yet another aspect, the at least one multifunctional epoxy resin is a diglycidyl ether of bisphenol-A (DGEBA), an advanced or higher molecular weight version of DGEBA, a diglycidyl ether of bisphenol-F, an epoxy novolac resin, or any combination thereof. Higher molecular weight versions or derivatives of DGEBA are prepared by the advancement process, where excess DGEBA is reacted with bisphenol-A to yield epoxy terminated products. The epoxy equivalent weights (EEW) for such products range from about 450 to 3000 or more. Because these products are solid at room temperature, they are often referred to as solid epoxy resins.

DGEBA or advanced DGEBA resins are often used in coating formulations due to a combination of their low cost and generally high performance properties. Commercial grades of DGEBA having an EEW ranging from about 174 to about 250, and more commonly from about 185 to about 195, are readily available. At these low molecular weights, the epoxy resins are liquids and are often referred to as liquid epoxy resins. It is understood by those skilled in the art that most grades of liquid epoxy resin are slightly polymeric, since pure DGEBA has an EEW of 174. Resins with EEW's between 250 and 450, also generally prepared by the advancement process, are referred to as semi-solid epoxy resins because they are a mixture of solid and liquid at room temperature. Generally, multifunctional resins with EEW's based on solids of about 160 to about 750 are useful in the prevent invention. In another aspect the multifunctional epoxy resin has an EEW in a range from about 170 to about 250.

Depending upon the end-use application, it can be beneficial to reduce the viscosity of the compositions of the present invention by modifying the epoxy component. For example, the viscosity can be reduced to allow an increase in the level of pigment in a formulation or composition while still permitting easy application, or to allow the use of a higher molecular weight epoxy resin. Thus, it is within the scope of the present invention for the epoxy component, which comprises at least one multifunctional epoxy resin, to further comprise a monofunctional epoxide. Examples of monoepoxides include, but are not limited to, styrene oxide, cyclohexene oxide, ethylene oxide, propylene oxide, butylene oxide, and the glycidyl ethers of phenol, cresols, tert-butylphenol, other alkyl phenols, butanol, 2-ethylhexanol, $C_4$ to $C_{14}$ alcohols, and the like, or combinations thereof. The multifunctional epoxy resin can also be present in a solution or emulsion, with the diluent being water, an organic solvent, or a mixture thereof.

Compositions of the present invention can be used to produce various articles of manufacture. Depending on the requirements during the manufacturing of or for the end-use application of the article, various additives can be employed in the formulations and compositions to tailor specific properties. These additives include, but are not limited to, solvents (including water), accelerators, plasticizers, fillers, fibers such as glass or carbon fibers, pigments, pigment dispersing agents, rheology modifiers, thixotropes, flow or leveling aids, surfactants, defoamers, biocides, or any combination thereof. It is understood that other mixtures or materials that are known in the art can be included in the compositions or formulations and are within the scope of the present invention.

The present disclosure also is directed to articles of manufacture comprising the compositions disclosed herein. For example, an article can comprise an amine-epoxy composition which comprises the reaction product of a curing agent composition and an epoxy composition. Articles of manufacture produced from amine-epoxy compositions disclosed herein include, but are not limited to, adhesives, coatings, primers, sealants, curing compounds, construction products, flooring products, and composite products. Further, such coatings, primers, sealants, or curing compounds can be applied to metal or cementitious substrates. Coatings based on these amine-epoxy compositions can be solvent-free or can contain diluents, such as water or organic solvents, as needed for the particular application. Coatings can contain various types and levels of pigments for use in paint and primer applications. Amine-epoxy coating compositions comprise a layer having a thickness ranging from 40 to 400 µm (micrometer), preferably 80 to 300 µm, more preferably 100 to 250 µm, for use in a protective coating applied on to metal substrates. In addition, for use in a flooring product or a construction product, coating compositions comprise a layer having a thickness ranging from 50 to 10,000 µm, depending on the type of product and the required end-properties. A coating product that delivers limited mechanical and chemical resistances comprises a layer having a thickness ranging from 50 to 500 µm, preferably 100 to 300 µm; whereas a coating product such as, for example, a self-leveling floor that delivers high mechanical and chemical resistances comprises a layer having a thickness ranging from 1,000 to 10,000 µm, preferably 1,500 to 5,000 µm.

Numerous substrates are suitable for the application of coatings of this invention with proper surface preparation, as is well known to one of ordinary skill in the art. Such substrates include, but are not limited to, concrete and various types of metals and alloys, such as steel and aluminum. Coatings of the present invention are suitable for the painting or coating of large metal objects or cementitious substrates including ships, bridges, industrial plants and equipment, and floors.

Coatings of this invention can be applied by any number of techniques including spray, brush, roller, paint mitt, and the like. In order to apply very high solids content or 100% solids coatings of this invention, plural component spray application equipment can be used, in which the amine and epoxy components are mixed in the lines leading to the spray gun, in the spray gun itself, or by mixing the two components together as they leave the spray gun. Using this technique can alleviate limitations with regard to the pot life of the formulation, which typically decreases as both the amine reactivity and the solids content increases. Heated plural component equipment can be employed to reduce the viscosity of the components, thereby improving ease of application.

Construction and flooring applications include compositions comprising the amine-epoxy compositions of the present invention in combination with concrete or other materials commonly used in the construction industry. Applications of compositions of the present invention include, but are not limited to composition's use as a primer, a deep penetrating primer, a coating, a curing compound, and/or a sealant for new or old concrete, such as referenced in ASTM C309-97, which is incorporated herein by reference. As a primer or a sealant, the amine-epoxy compositions of the present invention can be applied to surfaces to improve adhesive bonding prior to the application of a coating. As it pertains to concrete and cementitious application, a coating is an agent used for application on a surface to create a protective or decorative layer or a coat. Crack injection and crack filling products also can be prepared from the compositions disclosed herein. Amine-epoxy compositions of the present invention can be mixed with cementitious materials such as concrete mix to form polymer or modified cements, tile grouts, and the like. Non-limiting examples of composite products or articles comprising amine-epoxy compositions disclosed herein include tennis rackets, skis, bike frames, airplane wings, glass fiber reinforced composites, and other molded products.

In a particular use of the invention, these curing agent compositions will have applicability in making epoxy filament-wound tanks, infusion composites such as windmill blades, aerospace adhesives, industrial adhesives, as well as other related applications. A composite is a material made of different substances, and in the case of resin technologies, composites refer to resin impregnated systems where the resin is reinforced by the addition of reinforcing materials such as fillers and fibers for improving general properties of the resulting product. These materials work together but are not soluble in one another. In the present case, the binder component comprises the epoxy resin and epoxy curing agent (s). There are many types of composite applications such as prepegs, laminates, filament windings, braiding, pultrusion, wet lay and infusion composites. Resin infusion, or resin transfer, is a process by which resin is introduced to the composite mold, the reinforcement material having already been placed into the mold and closed prior to resin introduction. There are variations on this process such as those that are vacuum assisted.

An advantage of the use of benzylated polyamine of formula (I) in amine-epoxy compositions for making composites is the longer pot life and improved compatibility versus the unmodified polyamines. The advantage in adhesives is again longer pot life, in this case, so there is no skin-over before the parts are glued together, which is a major concern for large aircraft and windmill blades, when it takes a long time to place the adhesive beads across the entire part. Lower blush due to the benzyl group adds to the lower skin-over. The low viscosity allows for high filler levels. If the adhesive that is put on the part first starts to cure or starts to blush over before the last of the adhesive is dispensed on the part, when the two pieces are pressed together, there will be a weaker bond with the first bead.

After heat cure, the benzylated curing agents of the invention show good physical properties, comparable to amines like isophoronediamine (IPDA), which are used in composites for mechanical strength and compatibility with epoxy resin (see table below). However, these benzylated polyamine of formula (I) curing agents are lower Tg than IPDA so do not need as extensive a cure time/temperature in order to fully cure, resulting in lower processing costs. Like many amine-cured epoxy formulations, IPDA-EPON® 828 is known to be brittle when it does not fully cure, which is one of the reasons why formulators use high levels of plasticizers (benzyl alcohol) with IPDA in room-temperature cure coatings and why IPDA needs to be fully cured in composite applications.

The uses of epoxy resins which are cured, hardened, and/or crosslinked with amine-based curing agents are well known. These amine-epoxy materials are widely used in applications ranging from coatings, where they can be used in various applications such as primers, tie-coats, and finishes. They can be applied on many substrates. They can be used in laminates, adhesives, floorings, dust free finishes, secondary containment, linings, reinforcement, repair formulations, tooling, potting, and casting. They can be used in many industries like building (food manufacture, bridges, sewage plants), automotive, marine applications (ship painting, buoy painting, shipping containers), aeronautic (gluing of parts, honeycomb reinforcement for cabin structure, re-entry shield for satellites), electronic (printed circuit base, potting of electronic components, wire insulation), sports (tennis rackets, golf clubs, canoes, skis) and many mores applications such as filament winding for containers and tanks, laminates for wind energy and propellers for planes, syntactic foams and many other applications which are well known to those skilled in the art.

As curing agents for epoxy resins, they can be used in a wide range of applications such as coatings, where they can be used in various applications such as primers, tie-coats, and finishes. They can be applied on many substrates. They can be used in laminates, adhesives, floorings, dust free finishes, secondary containment, linings, reinforcement, repair formulations, tooling, potting, and casting. They can be used in many industries like building (food manufacture, bridges, sewage plants), automotive, marine applications (ship painting, buoy painting, shipping containers), aeronautic (gluing of parts, honeycomb reinforcement for cabin structure, re-entry shield for satellites), electronic (printed circuit base, potting of electronic components, wire insulation), sports (tennis rackets, golf clubs, canoes, skis) and many mores applications such as filament winding for containers and tanks, laminates for wind energy and propellers for planes, syntactic foams and many other applications which are well known to those skilled in the art.

The present invention also includes articles of manufacture comprising an amine-epoxy composition as described above. Such articles can include, but are not limited to, an adhesive, a coating, a primer, a sealant, a curing compound, a construction product, a flooring product, a composite product, laminate, potting compounds, grouts, fillers, cementitious grouts, or self-leveling flooring. Additional components or additives can be used together with the compositions of the present invention to produce articles of manufacture. Further, such coatings, primers, sealants, curing compounds or grouts can be applied to metal or cementitious substrates.

The disclosure is further illustrated by the following examples, which are not to be construed as imposing limitations to the scope of this invention. Various other aspects, embodiment, modifications, and equivalents thereof which, after reading the description herein, may suggest themselves to one of ordinary skill in the art without departing from the spirit of the present invention or the scope of the appended claims.

EXAMPLES

Example 1

Synthesis of Benzylated Metaxylylenediamine 1.15/1.0 Molar Ratio

The synthesis of benzylated metaxylylenediamine is a one-batch process. 416 g of mXDA (3.06 moles) and 4.2 g of Pd/C catalyst were placed in a 1-liter autoclave batch reactor. The reactor was sealed and subsequently purged with nitrogen and then with hydrogen to remove any air from the reactor. Over about 15 to 20 minutes, 372.4 g of benzaldehyde (3.51 moles) were added to the reactor. After the addition of the benzaldehyde was complete, the reactor contents were stirred for an additional 15 minutes or until the reaction was complete, at which time the reaction exotherm began to subside. At this point, the reactor was pressurized to 8.17 atm (120 psi) with hydrogen and the reactor was heated to 80° C. When the rate of hydrogen uptake slowed, the pressure was increased to 54.4 atm (800 psi) and the temperature was increased to 120°

C. The hydrogenation process continued until the rate of hydrogen uptake fell below 0.0034 MPa/min (0.5 psi/min). The total hydrogenation time was about 5 hours. The reactor was cooled to 60° C. and depressurized, and the reaction product was filtered to remove the catalyst. Water was removed using a rotary-evaporator operating under 20 mm Hg vacuum and temperatures up to 120° C. The resulting reaction product was benzylated mXDA, with viscosity, AHEW and amine value (measured). The properties are shown in Table 1.

TABLE 1

|  | Example 1 |
| --- | --- |
| Amine used | mXDA |
| Benzaldehyde to amine | 1.15/1 |
| Benzylated Amine quantity (g) | 775.5 |
| PD/C catalyst (g) | 4.2 |
| Average MW | 239.5 |
| AHEW | 84 |
| % free MXDA (GC) | 5.7 |
| Viscosity at 25° C. (mPa · s) | 42.7 |
| Actual Amine value (mg KOH/g) | 454 |
| Gel time at 25° C. (150 g) in minutes, with Epon 828 | 199 |

Example 2

Synthesis of Benzylated Metaxylylenediamine 1.30/1.0 Molar Ratio

The synthesis of benzylated metaxylylenediamine is a one-batch process. 750 g of mXDA (5.51 moles) and 7.5 g of Pd/C catalyst were placed in a 1-gallon autoclave batch reactor. The reactor was sealed and subsequently purged with nitrogen and then with hydrogen to remove any air from the reactor. Over about 15 to 20 minutes, 758.6 g of benzaldehyde (7.15 moles) were added to the reactor. After the addition of the benzaldehyde was complete, the reactor contents were stirred for an additional 15 minutes or until the reaction was complete, at which time the reaction exotherm began to subside. At this point, the reactor was pressurized to 8.17 atm (120 psi) with hydrogen and the reactor was heated to 80° C. When the rate of hydrogen uptake slowed, the pressure was increased to 54.4 atm (800 psi) and the temperature was increased to 120° C. The hydrogenation process continued until the rate of hydrogen uptake fell below 0.0034 MPa/min (0.5 psi/min). The total hydrogenation time was about 5 hours. The reactor was cooled to 60° C. and depressurized, and the reaction product was filtered to remove the catalyst. Water was removed using a rotary-evaporator operating under 20 mm Hg vacuum and temperatures up to 120° C. The resulting reaction product was benzylated mXDA, with viscosity, AHEW and amine value (measured). The properties are shown in Table 2.

TABLE 2

|  | Example 2 |
| --- | --- |
| Amine used | mXDA |
| Benzaldehyde to amine | 1.30/1 |
| Benzylated Amine quantity (g) |  |
| PD/C catalyst (g) | 7.5 |
| Average MW | 253 |
| AHEW | 93.7 |
| % free MXDA (GC) | 2.5 |
| Viscosity at 25° C. (mPa · s) | 44.5 |
| Actual Amine value (mg KOH/g) | 447.6 |
| Gel time at 25° C. (150 g) in minutes, with Epon 828 | 316 |

Comparative Example 3

Synthesis of Styrenated Metaxylylenediamine at about 1.30/1.0 Molar Ratio 817.2 g (6.0 mol) of metaxylylenediamine, manufactured by Mitsubishi Gas Co. Inc., Japan (hereafter "MXDA") and 2.9 g (0.13 moles) of lithium amide, a reagent manufactured by Merck, were charged to a flask having internal volume of 2 liters equipped with an agitator, a thermometer, a nitrogen gas inlet, a dropping funnel and a condenser.

Then, its temperature was raised to 80° C. in a nitrogen gas stream with stirring. After raising the temperature, 625.2 g (6.0 moles) of styrene, a special grade reagent, manufactured by Wako Pure Chemicals Industries Ltd., in Japan was added thereto drop-wise over 2 hours. After completion of drop-wise addition, its temperature was maintained at 80° C. for 1 hour.

Then, 618.2 g of distilled water of 80° C. was added thereto. After stirring for 15 minutes, the reaction liquid was kept still for 5 minutes and permitted to separate. The upper layer of the liquid in the flask was removed. The same amount of distilled water of 80° C., as mentioned above, was added to the residual and the same operation was carried out again. After repeating the same operation for 7 times, distilled water dissolved in the lower layer was removed by vacuum distillation, whereby 1115.2 g of polyamino compound was obtained, containing various addition products and 0.7% by weight of un-reacted MXDA.

TABLE 3

|  | Example 3 |
| --- | --- |
| Amine used | mXDA |
| Styrene to amine | 1.0/1.0 |
| Styrenated Amine quantity (g) | 1115.2 |
| Lithium amide catalyst (g) | 2.9 |
| Average MW | Ca 277 |
| AHEW | 105 |
| % free MXDA (GC) | 0.7 |
| Viscosity at 25° C. (mPa · s) | 66 |
| Actual Amine value (mg KOH/g) | 404 |
| Gel time at 25° C. (150 g) in minutes, with Epon 828 | 304 |

Examples 4-6

Coatings Prepared from Examples 1, 2 and 3

Table 4 summarizes the amine-epoxy compositions used in Examples 4, 5 and 6. For instance, the composition of Example 4 was 100 g of EPIKOTE™ 828 epoxy resin, and 44.2 g of the curing agent composition of Example 1. As indicated in Table 1, Example 1 was a curing agent composition comprising the reaction product of mXDA with benzaldehyde followed by reductive hydrogenation. The curing agents and their respective quantities shown in Examples 4, 5 and 6 were used as per Tables 4 and 5.

Comparing the viscosities of the curing agents from Tables 1, 2 and 3, it can be seen benzylation with benzaldehyde has a lesser effect on the viscosity of the end product. (See Examples 1-3). With regard to pot life, benzylation of polyamine of formula (I) has more or less the same effect as styrenation (for the same degree of reaction).

Table 4 shows that benzylation had a slightly favorable influence on the degree of cross-linking of the resin. The Tg was slightly higher. The same brittleness was encountered.

TABLE 4

|  | Example | | |
|---|---|---|---|
|  | 4 | 5 | 6 |
| Curing agent (Ex) | 1 | 2 | 3 |
| Weight Curing agent (g) | 44.2 | 49.4 | 52.6 |
| Resin weight (g) | 100 | 100 | 100 |
| Tg through DSC (° C.) init. | 81 | 75.6 | 67.7 |
| After 1 day | 81 | 75.4 | 65.2 |
| After 7 days | 82 | 74.8 | 65 |
| % Cure (DSC) after 1 day | ND | 98 | 96.7 |
| After 7 days | ND | 98.5 | 95 |

Drying times for the amine-epoxy compositions are summarized in Table 5. The drying time was determined at 23° C. and 65% relative humidity (RH) using a Beck-Koller recorder, in accordance with ASTM D5895. The procedure involved coating glass panels with the amine-epoxy compositions at approximately 6 mils wet film thickness. The selection of a coating composition with either a long or short drying time depends upon the requirements of the end-use application. Generally, the results in Table 5 indicated that the coatings of inventive Examples 4, 5 and 6 had various drying times depending on the degree of benzylation/styrenation used.

Table 5 also lists the Persoz Hardness test results after 1 day, 3 days, and 7 days, respectively, at 23° C. and 50% RH. Coatings were applied to glass panels at a wet film thickness of about 8 mils and tested in accordance with ISO 1522. As shown in Table 5, the formulations of inventive Examples 4 and 5 have similar Persoz hardness development to that of the styrenated curing agent. Additionally, the coatings of inventive Examples 4 and 5 had faster hardness development after 24 hours than the styrenated amine example.

Table 5 lists the 60° Gloss test results after 1 day, 3 days, and 7 days, respectively, at 23° C. and 50% RH. Results shown are the average of 10 measurements. Coatings were applied to glass panels at a wet film thickness of about 8 mils and tested in accordance with ASTM D523. The gloss was measured at an angle of 60° using a Gardner gloss meter. Measurements were made with the glass panel placed on a black cardboard background. As shown in Table 5, Example 4 has a lower gloss than Example 5 due to the higher content in free amine. However, Example 5 compares favorably with Example 6 with a high gloss value, this is due in both cases to the good miscibility of the curing agent with the resin.

TABLE 5

|  | Example | | |
|---|---|---|---|
|  | 4 | 5 | 6 |
| Curing agent (Ex) | 1 | 2 | 3 |
| Weight Curing agent (g) | 44.2 | 49.4 | 52.6 |
| Resin weight (g) | 100 | 100 | 100 |
| TFST @ 25° C. | | | |
| Phase 1 | 300 | 415 | 450 |
| Phase 2 | 350 | 445 | 510 |
| Phase 3 | 470 | 540 | 575 |
| Phase 4 | 520 | 660 | 750 |
| TFST @ 5° C. | | | |
| Phase 1 | ND | 680 | 735 |
| Phase 2 | ND | 950 | 935 |
| Phase 3 | ND | 1260 | 1200 |
| Phase 4 | ND | >24 hours | >24 hours |
| Persoz Hardness | | | |
| 1 day | 346 | 350 | 291 |
| 3 days | 365 | 380 | 370 |
| 7 days | 384 | 389 | 389 |
| Gloss after (60°) | | | |
| 1 day | 53 | 152 | 141 |
| 3 days | 60 | 149 | 145 |
| 7 days | 47 | 153 | 146 |
| Impact resistance - Direct (inch-pounds after 7 days) | ND | <2 | <2 |
| Impact resistance - Reverse (in/lbs after 7 days) | ND | <2 | <2 |

The pot life/gel time was run on a 150 g mass comprising the amine curing agent composition mixed stoichiometrically with standard bisphenol-A based epoxy resin (DGEBA, EEW=190) and measured with a Techno gel timer at 25° C.

For two component (2K) adhesives, improving pot life vs. aliphatic amine-based adhesives is attractive while maintaining physical properties because the long pot life allows sufficient working time to apply the adhesive beads to multiple points on large composite structures that need to be glued together. A significant factor in a long open time in an adhesive is long pot life to ensure minimal cure during the open time, but also minimal blush to prevent skin-over which can significantly weaken the adhesive bond. This is noticeable in large parts where the bond from the first-applied adhesive bead is weaker than the bond from the last-applied adhesive bead, and creates a weak point in the part.

Various amine curing agents were mixed stoichiometrically with standard bisphenol-A based epoxy resin (DGEBA, EEW=190) and coated on cold-rolled steel plates at a 2 mil thickness. Panels were cured at room temperature and evaluated at 2 days and 7 days. Blush resistance ratings at 25° C. are shown in the following Table 6.

In Table 6, Example 4 has a lower resistance to blush than Example 5 due to the higher content in free amine. However, Example 5 compares favorably with Example 6 with a high resistance to blush, this is due in both cases to the low free amine value and also the good miscibility of the curing agents with the resin.

TABLE 6

|  | TETA | IPDA | Example 1 | Example 2 | Example 3 |
|---|---|---|---|---|---|
| Blush rating | 4 | 2 | 1 | 0 | 0 |

*Blush scale:
0 = No blush
1 = Slight blush
2 = Some blush
3 = Moderate blush
4 = Severe blush
5 = Extreme blush The benzylation or the styrenation improves the blush resistance of these amines. Although in the tests presented the benzylation of the polyamine of formula (I) shows only a slight improvement over the use of styrenation, it is clear from synthesis of products 1 and 2 that the process used for the benzylation is easier to perform than that using the styrenation, without any loss to the properties of the cured epoxy resin.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A curing agent composition comprising at least one benzylated polyamine compound, the benzylated polyamine compound being a reaction product of a benzaldehyde compound or benzyl halide compound and a polyamine according to the following formula:

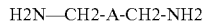

where A is a phenylene group or a cyclohexylene group; and wherein the curing agent composition further includes at least one multifunctional amine having three or more active amine hydrogens.

2. The curing agent of claim 1, wherein the benzylated polyamine compound is selected from the group consisting of benzylated orthoxylylenediamine, benzylated metaxylylenediamine, benzylated para xylylenediamine, 1,2-bis(aminomethyl)cyclohexane, 1,3-bis(aminomethyl)cyclohexane, 1,4-bis(aminomethyl)cyclohexane, and combinations thereof.

3. The curing agent of claim 1, wherein the at least one benzylated polyamine compound has the following formula:

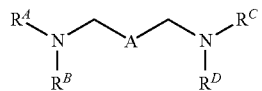

where $R^A$ is a substituted or unsubstituted benzyl group; $R^B$, $R^C$, and $R^D$ are independently $R^A$ or a hydrogen atom; A is a phenylene group or a cyclohexylene group, provided that the benzylated polyamine compound has more than two active amine hydrogen atoms.

4. The curing agent of claim 3, wherein $R^A$ and $R^C$ are benzyl or vanillyl.

5. The curing agent of claim 1, wherein the benzaldehyde compound includes a substituted benzaldehyde according to the formula PhCHO, where Ph is a moiety including an aromatic ring, wherein Ph is substituted with one or more of halogen atoms, C1-C4 alkyl, methoxy, ethoxy, amino, hydroxyl or cyano groups.

6. The curing agent of claim 1, wherein the benzaldehyde compound is benzaldehyde or vanillin.

7. The curing agent of claim 1, wherein the benzyl halide compound is selected from the group consisting of benzyl fluoride, benzyl chloride, benzyl bromide or benzyl iodide.

8. The curing agent of claim 1, wherein the benzyl halide compound includes a substituted benzyl group according to the formula PhCH2-, where Ph is a moiety including an aromatic ring, wherein Ph is substituted with one or more of halogen atoms, C1-C4 alkyl, methoxy, ethoxy, amino, hydroxyl or cyano groups.

9. A method for forming a curing agent composition comprising:
contacting a benzaldehyde compound or benzyl halide compound and a polyamine compound according to the following formula:

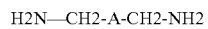

wherein A is a phenylene group or a cyclohexylene group;
reacting the benzaldehyde compound or benzyl halide compound and the polyamine compound under conditions sufficient to form a benzylated polyamine compound; wherein the curing agent composition further includes at least one multifunctional amine having three or more active amine hydrogens.

10. The method of claim 9, wherein the benzylated polyamine compound is selected from the group consisting of benzylated orthoxylylenediamine, benzylated metaxylylenediamine, benzylated para xylylenediamine, 1,2-bis(aminomethyl)cyclohexane, 1,3-bis(aminomethyl)cyclohexane, 1,4-bis(aminomethyl)cyclohexane, and combinations thereof.

11. The method of claim 9, wherein the at least one benzylated polyamine compound has the following formula:

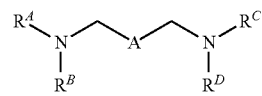

where $R^A$ is a substituted or unsubstituted benzyl group; $R^B$, $R^C$, and $R^D$ are independently $R^A$ or a hydrogen atom; A is a phenylene group or a cyclohexylene group, provided that the benzylated polyamine compound has more than two active amine hydrogen atoms.

12. The method of claim 11, wherein $R^A$ and $R^C$ are benzyl or vanillyl.

13. The method of claim 9, wherein the benzaldehyde compound includes a substituted benzaldehyde according to the formula PhCHO, where Ph is a moiety including an aromatic ring, wherein Ph is substituted with one or more of halogen atoms, C1-C4 alkyl, methoxy, ethoxy, amino, hydroxyl or cyano groups.

14. The method of claim 9, wherein the benzaldehyde compound is benzaldehyde or vanillin.

15. The method of claim 9, wherein the benzyl halide compound is selected from the group consisting of benzyl fluoride, benzyl chloride, benzyl bromide or benzyl iodide.

16. The method of claim 9, wherein the benzyl halide compound includes a substituted benzyl group according to the formula PhCH2-, where Ph is a moiety including an aromatic ring, wherein Ph is substituted with one or more of halogen atoms, C1-C4 alkyl, methoxy, ethoxy, amino, hydroxyl or cyano groups.

17. The method of claim 9, wherein the benzaldehyde compound and the polyamine compound are reacted in a molar reactant ratio of the benzaldehyde compound to the polyamine compound of 1:1 to 1.6:1.

18. The method of claim 9, wherein the benzyl halide compound and the polyamine compound are reacted in a molar reactant ratio of the benzyl halide compound to the polyamine compound of 1.2:1 to about 1.5:1.

19. An amine-epoxy composition comprising the contact product of:
a curing agent composition comprising at least one benzylated polyamine compound, the benzylated polyamine compound being a reaction product of a benzaldehyde compound or benzyl halide compound and a polyamine according to the following formula:

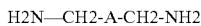

H2N—CH2-A-CH2-NH2 where A is a phenylene group or a cyclohexylene group; and
an epoxy composition comprising at least one multifunctional epoxy resin; wherein the curing agent composition further includes at least one multifunctional amine having three or more active amine hydrogens.

20. An article comprising the amine-epoxy composition of claim 19.

21. The article of claim 20, wherein the article is selected from the group consisting of adhesive, coating, primer, sealant, curing compound, construction product, flooring product, and composite product.

22. The composition of claim 1 wherein the multifunctional amine comprises at least one member selected from the group consisting of an aliphatic amine, a cycloaliphatic amine, an aromatic amine, a poly(alkylene oxide) diamine or triamine, a Mannich base derivative of an aliphatic amine, a cycloaliphatic amine, or an aromatic amine; a polyamide derivative of an aliphatic amine, a cycloaliphatic amine, or an aromatic amine with a dimer fatty acid, or a mixture of a dimer fatty acid and fatty acid; an amidoamine derivative of an aliphatic amine, a cycloaliphatic amine, or an aromatic amine with a fatty acid; and an amine adduct derivative of an aliphatic amine, a cycloaliphatic amine, or an aromatic amine with a diglycidyl ether of bisphenol A or bisphenol F, or an epoxy novolac resin, and any combination thereof.

23. The method of claim 9 wherein the multifunctional amine comprises at least one member selected from the group consisting of an aliphatic amine, a cycloaliphatic amine, an aromatic amine, a poly(alkylene oxide) diamine or triamine, a Mannich base derivative of an aliphatic amine, a cycloaliphatic amine, or an aromatic amine; a polyamide derivative of an aliphatic amine, a cycloaliphatic amine, or an aromatic amine with a dimer fatty acid, or a mixture of a dimer fatty acid and fatty acid; an amidoamine derivative of an aliphatic amine, a cycloaliphatic amine, or an aromatic amine with a fatty acid; and an amine adduct derivative of an aliphatic amine, a cycloaliphatic amine, or an aromatic amine with a diglycidyl ether of bisphenol A or bisphenol F, or an epoxy novolac resin, and any combination thereof.

24. The composition of claim 19 wherein the multifunctional amine comprises at least one member selected from the group consisting of an aliphatic amine, a cycloaliphatic amine, an aromatic amine, a poly(alkylene oxide) diamine or triamine, a Mannich base derivative of an aliphatic amine, a cycloaliphatic amine, or an aromatic amine; a polyamide derivative of an aliphatic amine, a cycloaliphatic amine, or an aromatic amine with a dimer fatty acid, or a mixture of a dimer fatty acid and fatty acid; an amidoamine derivative of an aliphatic amine, a cycloaliphatic amine, or an aromatic amine with a fatty acid; and an amine adduct derivative of an aliphatic amine, a cycloaliphatic amine, or an aromatic amine with a diglycidyl ether of bisphenol A or bisphenol F, or an epoxy novolac resin, and any combination thereof.

25. The composition of claim 1 wherein the multifunctional amine comprises at least one member selected from the group consisting of ethylenediamine, diethylenetriamine, triethylenetetraamine, pentaethylenehexamine, polypropyleneamines, aminopropylated ethylenediamines, aminopropylated propylenediamines, 1,6-hexanediamine, 3,3,5-trimethyl-1,6-hexanediamine, 3,5,5-trimethyl-1,6-hexanediamine, 2-methyl-1,5-pentanediamine, propylenediamine, dipropylenetriamine, tripropylenetetramine, N-3-aminopropyl ethylenediamine, N,N'-bis(3-aminopropyl)ethylenediamine, N,N,N'-tris(3-aminopropyl)ethylenediamine, N-3-aminopropyl-1,3-diaminopropane, N,N'-bis(3-aminopropyl)-1,3-diaminopropane, N,N,N'-tris(3-aminopropyl)-1,3-diaminopropane, 1,2-diaminocyclohexane, 1,3-diaminocyclohexane, 1,4-diaminocyclohexane, hydrogenated ortho-toluenediamine, hydrogenated meta-toluenediamine, metaxylylene diamine, hydrogenated metaxylylene diamine, isophorone diamine, norbornane diamines, 3,3'-dimethyl-4,4'-diaminodicyclohexyl methane, 4,4'-diaminodicyclohexyl methane, 2,4'-diaminodicyclohexyl methane, a mixture of methylene bridged poly(cyclohexyl-aromatic)amines, and combinations thereof.

26. The method of claim 9 wherein the multifunctional amine comprises at least one member selected from the group consisting of ethylenediamine, diethylenetriamine, triethylenetetraamine, pentaethylenehexamine, polypropyleneamines, aminopropylated ethylenediamines, aminopropylated propylenediamines, 1,6-hexanediamine, 3,3,5-trimethyl-1,6-hexanediamine, 3,5,5-trimethyl-1,6-hexanediamine, 2-methyl-1,5-pentanediamine, propylenediamine, dipropylenetriamine, tripropylenetetramine, N-3-aminopropyl ethylenediamine, N,N'-bis(3-aminopropyl)ethylenediamine, N,N,N'-tris(3-aminopropyl)ethylenediamine, N-3-aminopropyl-1,3-diaminopropane, N,N'-bis(3-aminopropyl)-1,3-diaminopropane, N,N,N'-tris(3-aminopropyl)-1,3-diaminopropane, 1,2-diaminocyclohexane, 1,3-diaminocyclohexane, 1,4-diaminocyclohexane, hydrogenated ortho-toluenediamine, hydrogenated meta-toluenediamine, metaxylylene diamine, hydrogenated metaxylylene diamine, isophorone diamine, norbornane diamines, 3,3'-dimethyl-4,4'-diaminodicyclohexyl methane, 4,4'-diaminodicyclohexyl methane, 2,4'-diaminodicyclohexyl methane, a mixture of methylene bridged poly(cyclohexyl-aromatic)amines, and combinations thereof.

27. The composition of claim 19 wherein the multifunctional amine comprises at least one member selected from the group consisting of ethylenediamine, diethylenetriamine, triethylenetetraamine, pentaethylenehexamine, polypropyleneamines, aminopropylated ethylenediamines, aminopropylated propylenediamines, 1,6-hexanediamine, 3,3,5-trimethyl-1,6-hexanediamine, 3,5,5-trimethyl-1,6-hexanediamine, 2-methyl-1,5-pentanediamine, propylenediamine, dipropylenetriamine, tripropylenetetramine, N-3-aminopropyl ethylenediamine, N,N'-bis(3-aminopropyl)ethylenediamine, N,N,N'-tris(3-aminopropyl)ethylenediamine, N-3-aminopropyl-1,3-diaminopropane, N,N'-bis(3-aminopropyl)-1,3-diaminopropane, N,N,N'-tris(3-aminopropyl)-1,3-diaminopropane, 1,2-diaminocyclohexane, 1,3-diaminocyclohexane, 1,4- diaminocyclohexane, hydrogenated ortho-toluenediamine, hydrogenated meta-toluenediamine, metaxylylene diamine, hydrogenated metaxylylene diamine, isophorone diamine, norbornane diamines, 3,3'-dimethyl-4,4'-diaminodicyclohexyl methane, 4,4'-diaminodicyclohexyl methane, 2,4'-diaminodicyclohexyl methane, a mixture of methylene bridged poly(cyclohexyl-aromatic)amines, and combinations thereof.

* * * * *